A. W. STEVENSON.
HORSE HAY-RAKES.
No. 195,312. Patented Sept. 18, 1877.
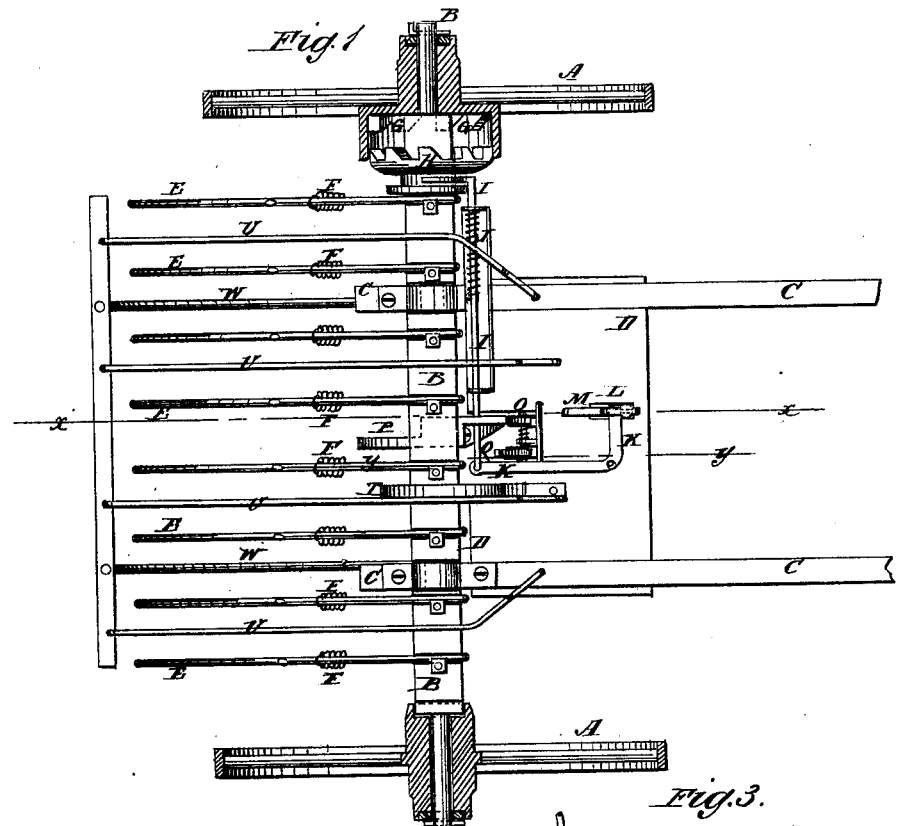
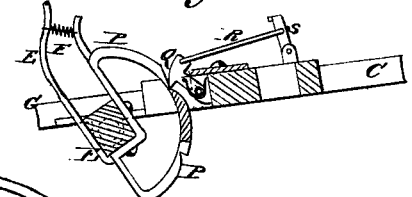
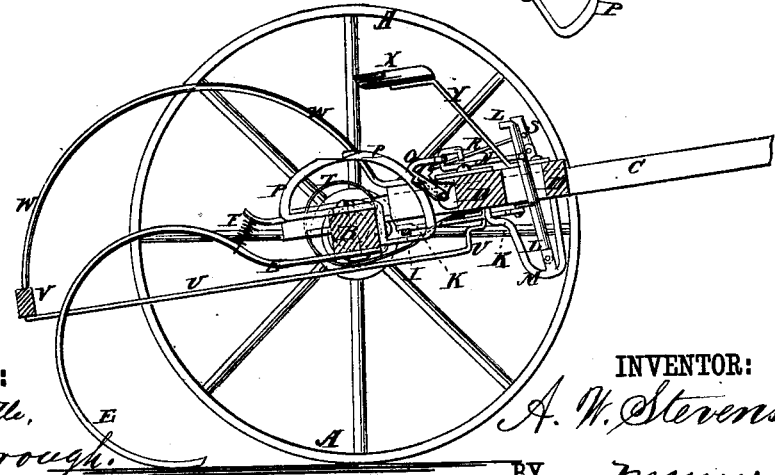
WITNESSES:
F. McArdle.
J. H. Scarborough.
INVENTOR:
A. W. Stevenson.
BY
ATTORNEYS.

UNITED STATES PATENT OFFICE.

ADOLPHUS W. STEVENSON, OF XENIA, OHIO.

IMPROVEMENT IN HORSE HAY-RAKES.

Specification forming part of Letters Patent No. 195,312, dated September 18, 1877; application filed May 28, 1877.

*To all whom it may concern:*

Be it known that I, ADOLPHUS W. STEVENSON, of Xenia, in the county of Greene and State of Ohio, have invented a new and useful Improvement in Horse Hay-Rake, of which the following is a specification:

Figure 1 is an under-side view of my improved hay-rake, the wheels being shown in section. Fig. 2 is a vertical longitudinal section of the same, taken through the line $x\ x$, Fig. 1. Fig. 3 is a detail section taken through the line $y\ y$, Fig. 1.

Similar letters of reference indicate corresponding parts.

The invention will first be described in connection with the drawing, and then pointed out in the claims.

A are the wheels, which revolve upon the journals of the axle B. The axle B works in bearings attached to the shaft C, to which the platform D is attached. E are the teeth, the lower parts of which are curved in the usual way, the points of the teeth being bent upward, so that they will slide along the ground, but will not scratch or catch, upon the ground. The upper parts of the teeth E are so bent as to pass around the lower, the forward, and the upper sides of the axle B, and are secured to said axle by hook-bolts. The upper ends of the teeth E project above and parallel with the bodies of said teeth, and are connected with said bodies by long loops and spiral springs F, placed around said loops and interposed between said ends and bodies.

The bodies of the teeth E are flattened a little just before they reach the axle B, to give them greater elasticity, and render them less liable to break should their points strike an obstruction.

In case the teeth should be strained or weakened they will still be held to their work by the spiral springs F, and by the elasticity of the projecting upper ends of said teeth.

The inner end of the hub of one of the wheels A is enlarged and recessed, and in the bottom of the cavity thus formed are formed clutch-teeth G, to engage with the teeth of the clutch H, which slides, but does not turn, upon the axle B. The hub of the clutch H has a ring-groove formed around it, to receive a fork formed upon the outer end of the rod or bar I, which slides in keepers attached to the shafts C, and has a spiral spring, J, placed upon it to hold the clutch H away from the clutch-teeth G. The inner end of the bar I is pivoted to the end of the bent lever K, which is pivoted at its angle to the platform D, and its other end is pivoted to the lever L. The lever L passes through a slot in the platform D, and its lower end is pivoted to a bracket or hanger, M, attached to the lower side of the platform D. To the upper end of the lever L is attached a foot-rest, to enable it to be operated by the driver with his foot. To the lever L, just above the platform D, is pivoted the forward end of a connecting-rod, N, the rear end of which is connected with the spring-latch O secured in a slot in the platform D.

The spring-latch O rests against the convex surface of a curved bar, P, attached to the axle B, so as, when the teeth E are in working position, to engage with a notch, shoulder, or catch formed in the said bar, to prevent the teeth from rising and passing over any of the hay.

With this construction, when a sufficient quantity of hay has been collected the driver presses the upper end of the lever L forward with his foot. The first effect of this movement is to draw the spring-latch O back from the bar P, to allow the teeth E to rise. The next effect is to push the clutch H outward to engage with the clutch-teeth G of the wheel A, to cause the said wheel A to turn the axle B and raise the teeth E, leaving the hay in a windrow. As the teeth E drop the collected hay the side edge of the bar P strikes against the side of the bent lever K, and draws back the clutch H, at which time the spring-latch Q, pivoted in a slot in the platform D, engages with a notch, shoulder, or catch in the said bar P, and holds the said teeth E suspended. With the spring-latch Q is connected the rear end of the connecting-rod R, the forward end of which is pivoted to the foot-lever S. The lower end of the foot-lever S is pivoted to the platform D, or to a support attached to said platform, so that the driver can push the lever S forward with his foot, to draw back the spring-latch Q and allow the teeth E to drop.

The teeth E may be allowed to drop by their own weight, or their descent may be assured by a spring, T, attached to the axle B and platform D in such a way that it will be coiled by the rise of the teeth E.

The teeth E are kept from carrying the hay with them as they rise by the rods U, the rear ends of which, a little beyond the sweep of the teeth E, are attached to a cross-bar, V. The forward ends of the rods U are bent upward, and the forward ends of the side rods U are also bent inward, and are attached to the platform D.

The cross-bar V is made of a length about equal to the width of the rake, and is attached to the rear ends of the arched rods W, the forward ends of which are attached to the platform D. The driver's seat X is attached to the upper end of the standard Y, the lower end of which is attached to the platform D.

By this construction the cross-bar V will be braced in both directions, and will be held firmly in place.

Having thus described my invention, I claim as new and desire to secure by Letters Patent—

1. The spring T, combined with axle, platform, and teeth, to be coiled by the rise of the latter, and exert a downward pressure on said teeth as they descend, substantially as set forth.

2. The combination of the spring-latch Q, the connecting-rod R, and the foot-lever S with the curved bar P, the axle B, and the platform D, substantially as herein shown and described.

ADOLPHUS W. STEVENSON.

Witnesses:
ABNER S. BUCK,
J. C. CHALMERS.